(12) United States Patent
Daisley

(10) Patent No.: US 11,994,385 B2
(45) Date of Patent: May 28, 2024

(54) SAMPLE CONTAINER SPRING CHECK APPARATUS

(71) Applicant: Roche Diagnostics Operations, Inc., Indianapolis, IN (US)

(72) Inventor: Richard-Paul Daisley, Stuttgart (DE)

(73) Assignee: ROCHE DIAGNOSTICS OPERATIONS, INC., Indianapolis, IN (US)

(*) Notice: Subject to any disclaimer, the term of this patent is extended or adjusted under 35 U.S.C. 154(b) by 481 days.

(21) Appl. No.: 17/318,085

(22) Filed: May 12, 2021

(65) Prior Publication Data

US 2021/0364283 A1 Nov. 25, 2021

(30) Foreign Application Priority Data

May 20, 2020 (EP) ..................................... 20175851

(51) Int. Cl.
*G01B 21/24* (2006.01)
*G01N 35/04* (2006.01)

(52) U.S. Cl.
CPC ............. *G01B 21/24* (2013.01); *G01N 35/04* (2013.01); *G01N 2035/0432* (2013.01)

(58) Field of Classification Search
None
See application file for complete search history.

(56) References Cited

U.S. PATENT DOCUMENTS

| 4,788,773 | A * | 12/1988 | Palsgard | G01C 9/08 33/775 |
| 6,871,413 | B1 * | 3/2005 | Arms | G01C 9/06 33/366.11 |
| 7,856,727 | B2 * | 12/2010 | Chiorean | E02F 9/2095 33/366.11 |
| 8,100,266 | B2 | 1/2012 | Lackner et al. | |
| 8,661,701 | B2 * | 3/2014 | Wixey | G01C 9/06 33/534 |
| 8,830,449 | B1 | 9/2014 | Lamego et al. | |

(Continued)

FOREIGN PATENT DOCUMENTS

| CA | 3107557 | A1 * | 1/2020 | .............. E02F 3/308 |
| CN | 106931930 | A | 7/2017 | |

(Continued)

OTHER PUBLICATIONS

Clifford, Michelle and Gomez, Leticia, Measuring Tilt with Low-g Accelerometers, Freescale Semiconductor Application Note, 2005, 8 pp., AN3107, Rev. 0.

(Continued)

*Primary Examiner* — Yaritza Guadalupe-McCall
(74) *Attorney, Agent, or Firm* — Woodard, Emhardt, Henry, Reeves & Wagner LLP

(57) ABSTRACT

An apparatus for measuring an angle between a longitudinal axis of a sample container inserted into an opening of a sample container carrier and a reference ray, the apparatus comprising a first accelerometer being fixable to the sample container and being adapted to generate a number of first accelerometer signals being dependent on the orientation of the sample container, and a calculation unit being coupled to the first accelerometer and being adapted to calculate the angle depending on the number of first accelerometer signals.

7 Claims, 2 Drawing Sheets

(56) References Cited

U.S. PATENT DOCUMENTS

| | | | | |
|---|---|---|---|---|
| 9,528,933 B2* | 12/2016 | Moitzi | ................... | G01N 21/49 |
| 9,778,013 B2* | 10/2017 | Gesuita | ............. | G01C 19/5712 |
| 9,804,181 B2* | 10/2017 | German | ................ | B65G 43/08 |
| 10,247,550 B2* | 4/2019 | Lin | ................... | G01C 21/1654 |
| 10,365,091 B2* | 7/2019 | Wögerbauer | ........... | G01B 21/22 |
| 10,760,904 B2* | 9/2020 | Yamada | ................ | G01B 21/22 |
| 11,656,071 B2* | 5/2023 | Rizzardini | ............. | G01D 5/142 |
| | | | | 700/275 |
| 2018/0356435 A1 | 12/2018 | Huber et al. | | |
| 2019/0291279 A1* | 9/2019 | Nakayama | ............. | G01C 25/00 |

FOREIGN PATENT DOCUMENTS

| | | | |
|---|---|---|---|
| DE | 202022102223 U1 * | 9/2023 | |
| JP | 2010-101689 A | 5/2010 | |
| JP | 2011-173043 A | 9/2011 | |
| JP | 2014-035290 A | 2/2014 | |
| JP | 2019-104598 A | 6/2019 | |
| WO | 2016/147714 A1 | 9/2016 | |
| WO | 2019/152494 A1 | 8/2019 | |

OTHER PUBLICATIONS

European Search Report dated Nov. 4, 2020, in Application No. 20175851.3, 2 pp.

* cited by examiner

SAMPLE CONTAINER SPRING CHECK APPARATUS

CROSS-REFERENCE TO RELATED APPLICATIONS

This application claims priority to European Patent Application No. 20175851.3, filed 20 May 2020, the disclosure of which is hereby incorporated by reference in its entirety.

TECHNICAL FIELD

The disclosure relates to an apparatus for measuring an angle between a longitudinal axis of a sample container inserted into an opening of a sample container carrier and a reference ray.

SUMMARY

Although the embodiments of the present disclosure are not limited to specific advantages or functionality, it is noted that in accordance with the present disclosure an apparatus for measuring an angle between a longitudinal axis of a sample container inserted into an opening of a sample container carrier and a reference ray is provided that is highly accurate and easy to manufacture.

In accordance with one embodiment of the present disclosure, an apparatus for measuring an angle between a longitudinal axis of a sample container inserted into an opening of a sample container carrier and a reference ray is provided, the apparatus comprising a first accelerometer being fixable to the sample container and being adapted to generate a number of first accelerometer signals being dependent on the orientation of the sample container, and a calculation unit being coupled to the first accelerometer and being adapted to calculate the angle depending on the number of first accelerometer signals.

These and other features and advantages of the embodiments of the present disclosure will be more fully understood from the following detailed description taken together with the accompanying claims. It is noted that the scope of the claims is defined by the recitations therein and not by the specific discussions of features and advantages set forth in the present description.

BRIEF DESCRIPTION OF THE DRAWINGS

The following detailed description of the embodiments of the present description can be best understood when read in conjunction with the following drawings, where like structure is indicated with like reference numerals and in which.

Figure 1:
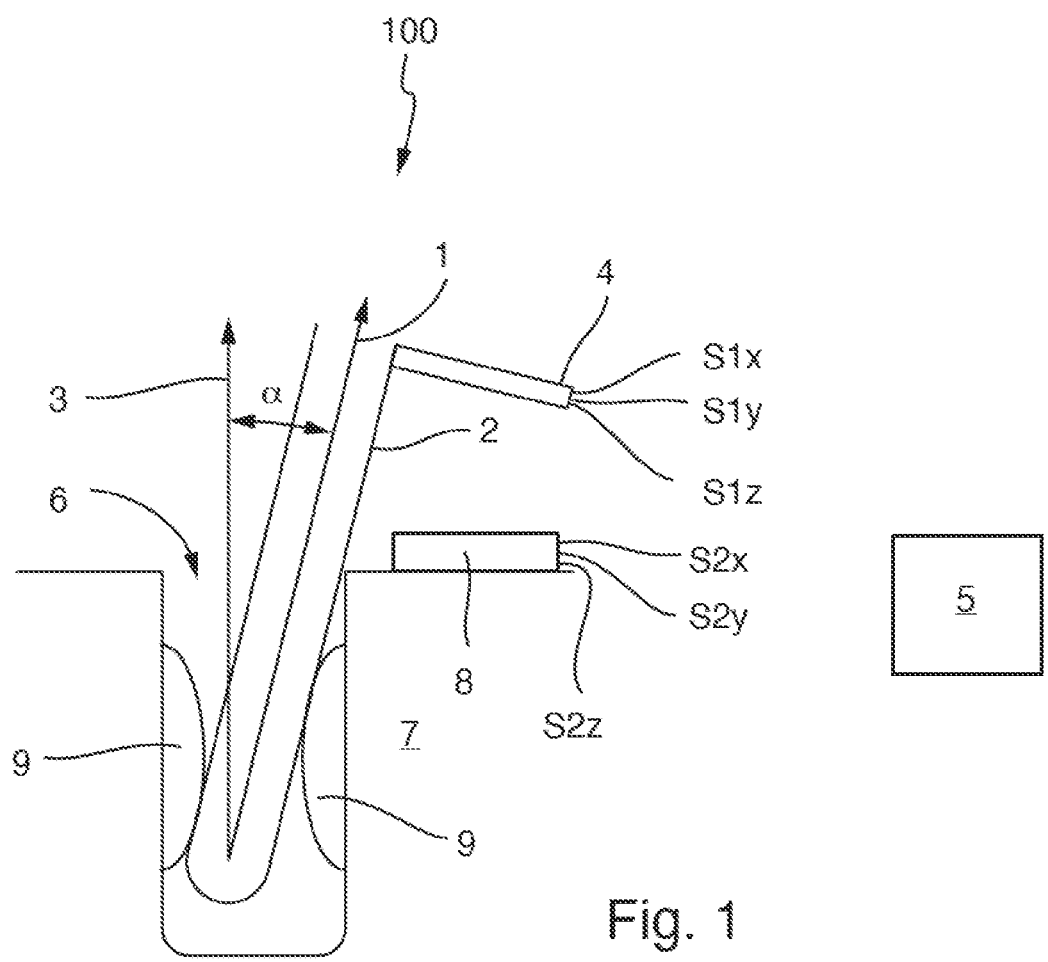
FIG. 1 schematically shows an apparatus for measuring an angle between a longitudinal axis of a sample container inserted into an opening of a sample container carrier and a reference ray.

Skilled artisans appreciate that elements in the figures are illustrated for simplicity and clarity and have not necessarily been drawn to scale. For example, dimensions of some of the elements in the figures may be exaggerated relative to other elements to help improve understanding of the embodiment(s) of the present disclosure

DETAILED DESCRIPTION

The sample container carrier may, e.g., be a single sample container carrier or may, e.g., be part of a circular transport chain comprising a number of linked sample container carriers forming the chain.

The apparatus is adapted to measure an angle between a longitudinal axis of a sample container being inserted into a corresponding opening of a sample container carrier and a reference ray. The sample container may be a conventional sample container, e.g., in form of a conventional sample tube. Nevertheless, the sample container may alternatively be embodied as a sample container dummy having the same relevant dimensions as a normally used sample container but not being intended to contain a sample.

The apparatus comprises a first accelerometer being fixable or fixed to the sample container and being adapted to generate a number of first accelerometer signals being dependent on the orientation of the sample container in space. Regarding the basic functional principles of accelerometers, reference is made to the relevant technical literature.

The apparatus further comprises a calculation unit, e.g., in form of a microprocessor, being coupled to the first accelerometer and being adapted to calculate the angle depending on the number of first accelerometer signals. The calculation of an angle depending on accelerometer signals is well known in the art, thus reference is insofar made to the relevant technical literature.

According to an embodiment, the reference ray is a longitudinal axis of the, in particular circular, opening of the sample container carrier.

According to an embodiment, the first accelerometer is adapted to generate three first accelerometer signals dependent on the orientation of the sample container in space. A first of the three first accelerometer signals may, e.g., denote acceleration in x direction, a second of the three first accelerometer signals may, e.g., denote acceleration in y direction, and a third of the three first accelerometer signals may, e.g., denote acceleration in z direction.

According to an embodiment, the apparatus comprises a second accelerometer being fixable or fixed to the sample container carrier and being adapted to generate a number of second accelerometer signals being dependent on the orientation of the sample container carrier in space, wherein the calculation unit is coupled to the second accelerometer and is adapted to calculate the angle depending on the number of first accelerometer signals and depending on the number of second accelerometer signals.

According to an embodiment, the second accelerometer is adapted to generate three second accelerometer signals dependent on the orientation of the sample container carrier in space. A first of the three second accelerometer signals may, e.g., denote acceleration in x direction, a second of the three second accelerometer signals may, e.g., denote acceleration in y direction, and a third of the three second accelerometer signals may, e.g., denote acceleration in z direction.

According to an embodiment, the three first accelerometer signals represent a first vector denoting the orientation of the sample container in space, and the three second accelerometer signals represent a second vector denoting the orientation of the reference ray in space, wherein the calculation unit is adapted to calculate the angle based on the dot product of the first vector and the second vector.

According to an embodiment, the sample container carrier comprises a spring device or spring insert being inserted into the opening of the sample container carrier and being adapted to fix the sample container being inserted into the opening by applying a spring force to the inserted sample container, wherein the calculation unit is adapted to check the correct function of the spring device depending on the calculated angle. If the spring device functions correctly, a longitudinal axis of the sample container inserted into the opening typically extends basically in the z direction. Thus, the calculated angle may correspond to a set point, e.g., a set point of 0°, if the spring device functions ideally. If the calculated angle deviates more than a given threshold from the set point, e.g., more than 5° to 10° from the set point, it can be concluded that the spring device does not function properly.

According to an embodiment, the calculation unit is adapted to check if the spring device is correctly inserted into the opening depending on the calculated angle.

According to an embodiment, the calculation unit is adapted to check if the spring device is worn or broken depending on the calculated angle.

The position of the spring device inserted into the sample container affects the positioning of the sample container. A sample container that sits skewed in the opening has a negative effect on the container handling and processing efficiencies.

The invention provides the ability to measure the skewness of a, e.g., reference, sample container which in turn can be used to determine, e.g., the position of the spring device or insert.

The sample container may be treated as a vector with its direction defined by the following {ax, ay, az}.

A reference vector, which may be described as the sample container carrier vector, is defined with the direction {bx, by, bz}.

It is assumed that the sample container carrier and the sample container inserted into the opening of the sample container carrier are both stationary with a linear acceleration of zero during a measurement.

For simplicity, the accelerometer assigned to the sample container carrier may be aligned to a flat top surface of the sample container carrier, wherein the flat top surface is perpendicular to the longitudinal axis of the circular opening of the sample container carrier.

The measurements from the two accelerometers will reflect the distribution of the gravitational pull based on the orientation of the object to which they are attached. Using the dot product of two vectors, the angle between the two vectors, in this case the tilt angle of the sample container with respect to the top surface of the sample container carrier, can be determined.

A known angle of, e.g., zero reflects an error free state in which a sample container sits perpendicular to the top surface of the sample container carrier. A sample container having a diameter of, e.g., 13 mm and a tilt angle of 2-5 degrees reflects a sample container with its outer surface being in contact with the inner diameter of the border of the opening, wherein this case describes a sample container carrier with no spring device or a broken or missing spring device in the opening.

By means of the inventive apparatus an automated predictive maintenance of sample container carriers may be performed. Further, a characterization or test of tube types, detection of new tube types, etc. may be achieved. Further, a sample container carrier checkup during a down time when the sample container carrier is actually not used may be performed. Predictive maintenance is done by exchanging the sample container carrier or the inserted spring device when the measured angle is higher than a predetermined angle, e.g., 2 degrees.

FIG. 1 schematically depicts a cross sectional side view of an apparatus 100 for measuring an angle α between a longitudinal axis 1 of a sample container 2 inserted into an opening 6 of a sample container carrier 7 and a reference ray 3. As depicted, the reference ray 3 forms a longitudinal axis of the opening 6 of the sample container carrier 7.

In FIG. 1, only a single opening 6 of the sample container carrier 7 is depicted. Nevertheless, the sample container carrier 7 may have more than one opening 6, e.g., 5 linearly arranged openings 6 or 50 openings arranged in rows and columns.

The apparatus 100 comprises a first accelerometer 4 being fixed to the sample container 2 and being adapted to generate three first accelerometer signals S1x, S1y, S1z dependent on the orientation of the sample container 2 in space.

The apparatus 100 comprises a second accelerometer 8 being fixed to a top surface of the sample container carrier 7 and being adapted to generate three second accelerometer signals S2x, S2y, S2z dependent on the orientation of the sample container carrier 7 in space.

The three first accelerometer signals S1x, S1y, S1z represent a first vector denoting the orientation of the sample container 2 in space. The first vector may be denoted as $$\vec{G1} = \begin{pmatrix} S1x \\ S1y \\ S1z \end{pmatrix}$$

Accordingly, the three second accelerometer signals S2x, S2y, S2z represent a second vector denoting the orientation of the reference ray 3 in space. The second vector may be denoted as $$\vec{G2} = \begin{pmatrix} S2x \\ S2y \\ S2z \end{pmatrix}$$

The calculation unit 5 is adapted to calculate the angle α based on the dot product of the first vector and the second vector. It is:

$$\vec{G1} \cdot \vec{G2} = |\vec{G1}| \, |\vec{G1}| \cos(\alpha)$$

It follows $$\cos(\alpha) = \frac{S1xS2x + S1yS2y + S1zS2z}{\sqrt{S1x^2 + S1y^2 + S1z^2} \, \sqrt{S2x^2 + S2y^2 + S2z^2}}$$

Consequently, the angle α may be calculated based on the above equation.

The sample container carrier 7 comprises a spring device 9 being inserted into the opening 6 of the sample container carrier 7 and being adapted to fix the sample container 2 being inserted into the opening 6 by applying a spring force to the inserted sample container 2.

If the spring device 9 functions as intended the angle α is zero, i.e. the longitudinal axis 1 of the sample container 2 extends only in z direction. If the measured angle α deviates more than a given threshold form zero, e.g., more than +/−3 degrees, a malfunction of the spring device 9 may be determined.

The calculation unit 5 is adapted to check the function of the spring device 9 depending on the calculated angle α. The calculation unit may, e.g., be adapted to check if the spring device 9 is correctly inserted into the opening 6 depending on the calculated angle α and/or if the spring device 9 is worn or broken.

For that purpose, the sample container 2 may form a reference sample container being part of the apparatus 100, wherein the first accelerometer 4 is permanently fixed to the reference sample container 2. This reference sample container 2 may then be used to check the correct function of each spring device 9 of a plurality of sample container carriers 7.

The calculation unit 5 may store respective measured angles for each sample container carrier 7 and, e.g., performs predictive maintenance on the absolute change or rate of change of the measured angles.

Figure 2:
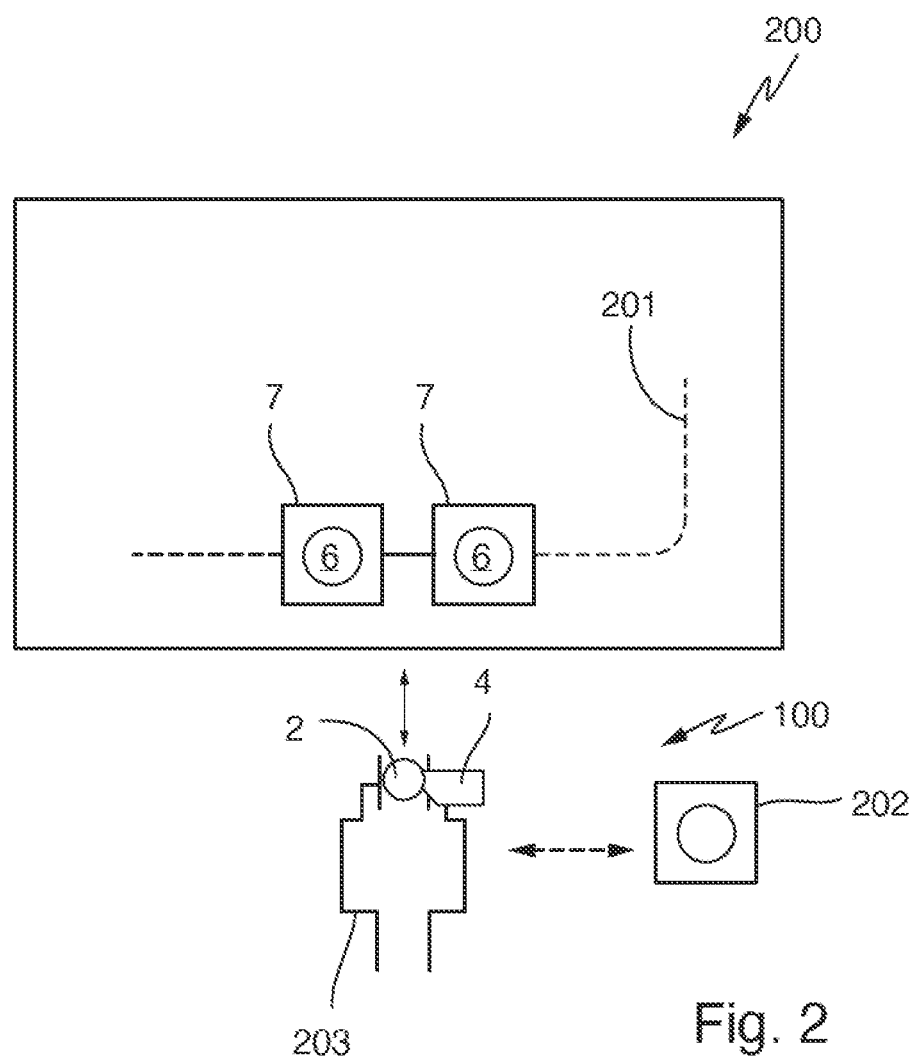
FIG. 2 schematically shows a laboratory automation system comprising a circular transport chain comprising a number of linked sample container carriers forming the chain and the apparatus of FIG. 1.

FIG. 2 schematically shows a laboratory automation system 200 comprising a circular transport chain 201 comprising a number of linked sample container carriers 7 forming the chain 201 and the apparatus 100 of FIG. 1. The apparatus 100 serves to check the correct function of the sample container carriers 7 during a down-time of the laboratory automation system 200.

During normal operation of the laboratory automation system 200 the reference sample container 2 having the first accelerometer 4 fixed to it is stored in a storage unit 202. The sample container carriers 7 transport sample containers in form of laboratory sample tubes containing laboratory samples to be processed. The laboratory sample tubes are transported along a movement direction of the chain 201 when being inserted into the openings 6 of the sample container carriers 7.

During a down-time of the laboratory automation system 200 no sample tubes are inserted into the openings 6 of the sample container carriers 7. A gripper 203 removes the reference sample container 2 having the first accelerometer 4 fixed to it from the storage unit 202 and sequentially inserts the reference sample container 2 into the openings 6 of the sample container carriers 7 to be checked. The respective resulting angle α is then used to check the sample container carriers 7, in particular is used to check the spring device 9 of the respective sample container carriers 7. Alternatively, a spring status can be checked in an operation mode, if a problem with one sample container carrier is detected or becomes otherwise apparent.

What is claimed is:

1. An apparatus for measuring an angle (α) between a longitudinal axis of a sample container inserted into an opening of a sample container carrier and a reference ray, the apparatus comprising:
    a first accelerometer being fixable to the sample container and being adapted to generate a number of first accelerometer signals (S1x, S1y, S1z) being dependent on the orientation of the sample container,
    a second accelerometer being fixable to the sample container carrier and being adapted to generate a number of second accelerometer signals (S2x, S2y, S2z) being dependent on the orientation of the sample container carrier,
    a calculation unit being coupled to the first accelerometer and being coupled to the second accelerometer and being adapted to calculate the angle (α) depending on the number of first accelerometer signals (S1x, S1y, S1z) and depending on the number of second accelerometer signals (S2x, S2y, S2z), and
    a reference sample container, wherein the first accelerometer is fixed to the reference sample container,
    wherein the sample container carrier comprises a spring device being inserted into the opening of the sample container carrier and being adapted to fix the sample container being inserted into the opening by applying a spring force to the inserted sample container, and
    wherein the calculation unit is adapted to check the function of the spring device depending on the calculated angle (α).

2. The apparatus according to claim 1, wherein the reference ray forms a longitudinal axis of the opening of the sample container carrier.

3. The apparatus according to claim 1, wherein the first accelerometer is adapted to generate three first accelerometer signals dependent on the orientation of the sample container in space.

4. The apparatus according to claim 1, wherein the second accelerometer is adapted to generate three second accelerometer signals dependent on the orientation of the sample container carrier in space.

5. The apparatus according to claim 4, wherein the three first accelerometer signals represent a first vector denoting the orientation of the sample container in space, the three second accelerometer signals represent a second vector denoting the orientation of the reference ray in space, and wherein the calculation unit is adapted to calculate the angle based on the dot product of the first vector and the second vector.

6. The apparatus according to claim 1, wherein the calculation unit is adapted to check if the spring device is correctly inserted into the opening depending on the calculated angle.

7. The apparatus according to claim 1, wherein the calculation unit is adapted to check if the spring device is worn or broken depending on the calculated angle.

* * * * *